United States Patent
Chien

(10) Patent No.: US 10,848,489 B2
(45) Date of Patent: *Nov. 24, 2020

(54) TIMESTAMP-BASED AUTHENTICATION WITH REDIRECTION

(71) Applicant: Daniel Chien, Bellevue, WA (US)

(72) Inventor: Daniel Chien, Bellevue, WA (US)

(*) Notice: Subject to any disclaimer, the term of this patent is extended or adjusted under 35 U.S.C. 154(b) by 0 days.

This patent is subject to a terminal disclaimer.

(21) Appl. No.: 16/359,962

(22) Filed: Mar. 20, 2019

(65) Prior Publication Data

US 2020/0195639 A1    Jun. 18, 2020

Related U.S. Application Data

(63) Continuation-in-part of application No. 16/220,652, filed on Dec. 14, 2018.

(51) Int. Cl.
*H04L 29/06* (2006.01)
*G06F 1/14* (2006.01)
*G06F 21/45* (2013.01)

(52) U.S. Cl.
CPC ............ *H04L 63/0876* (2013.01); *G06F 1/14* (2013.01); *G06F 21/45* (2013.01); *H04L 63/083* (2013.01);
(Continued)

(58) Field of Classification Search
CPC ............... H04L 63/083; H04L 63/0846; H04L 63/0876; G06F 1/14
See application file for complete search history.

(56) References Cited

U.S. PATENT DOCUMENTS 6,016,553 A  1/2000 Schneider et al.
6,185,678 B1  2/2001 Arbaugh et al.
(Continued)

FOREIGN PATENT DOCUMENTS

WO  2005/020446  3/2005
WO  2016/176686  11/2016
(Continued)

OTHER PUBLICATIONS

Horowitz, Michael, "Examples of Links That Lie," Sep. 2004, 11 pages, http://www.michaelhorowitz.com/linksthatlie.html (accessed Feb. 8, 2008).
(Continued)

*Primary Examiner* — Linglan E Edwards
(74) *Attorney, Agent, or Firm* — Benedict R. Dugan; Lowe Graham Jones PLLC

(57) ABSTRACT

Techniques for computer security, and more specifically timestamp-abased authentication, are described. Some implementations provide an authentication method that utilizes an authentication process that is shared as a secret between a client and an authenticator. The process provides as output a number that is based on a timestamp. To authenticate the client when it attempts to access a target service, both the client and authenticator execute the authentication process using locally generated timestamps. If the outputs of the authentication process match, the client is authenticated. If not, subsequent network communications from the client are either denied or redirected to an alternative computing system that masquerades as the target service.

20 Claims, 10 Drawing Sheets

(52) U.S. Cl.
CPC ...... *H04L 63/108* (2013.01); *H04L 2463/121* (2013.01)

(56) References Cited

U.S. PATENT DOCUMENTS

| | | |
|---|---|---|
| 6,502,135 B1 | 12/2002 | Munger et al. |
| 6,654,796 B1 | 11/2003 | Slater et al. |
| 6,687,226 B1 | 2/2004 | Galyas |
| 6,888,834 B1 | 5/2005 | Wood et al. |
| 7,111,163 B1 | 9/2006 | Haney |
| 7,143,175 B2 | 11/2006 | Adams et al. |
| 7,346,770 B2 | 3/2008 | Swander et al. |
| 7,363,494 B2 * | 4/2008 | Brainard .............. G06Q 20/32 380/232 |
| 7,363,656 B2 | 4/2008 | Weber et al. |
| 7,401,358 B1 | 7/2008 | Christie et al. |
| 7,457,823 B2 | 11/2008 | Shraim et al. |
| 7,461,404 B2 | 12/2008 | Dudfield et al. |
| 7,490,237 B1 * | 2/2009 | Morais .................. H04L 63/08 713/166 |
| 7,536,723 B1 | 5/2009 | Bhagwat et al. |
| 7,540,028 B2 | 5/2009 | Ahmed et al. |
| 7,602,731 B2 | 10/2009 | Jain |
| 7,626,940 B2 | 12/2009 | Jain |
| 7,725,936 B2 | 5/2010 | Banerjee et al. |
| 7,797,436 B2 | 9/2010 | Banerjee et al. |
| 7,826,602 B1 | 11/2010 | Hunyady et al. |
| 7,832,009 B2 | 11/2010 | Wang et al. |
| 7,979,889 B2 | 7/2011 | Gladstone et al. |
| 8,161,552 B1 | 4/2012 | Sun et al. |
| 8,423,631 B1 | 4/2013 | Mower et al. |
| 8,495,700 B2 | 7/2013 | Shahbazi |
| 8,788,839 B1 | 7/2014 | Dong et al. |
| 8,813,186 B2 | 8/2014 | Hegg et al. |
| 8,848,608 B1 | 9/2014 | Addepalli et al. |
| 8,950,007 B1 | 2/2015 | Teal et al. |
| 9,015,090 B2 | 4/2015 | Chien |
| 9,172,721 B2 | 10/2015 | Jain |
| 9,413,783 B1 | 8/2016 | Keogh |
| 9,654,458 B1 | 5/2017 | Bhaktwatsalam et al. |
| 9,825,911 B1 | 11/2017 | Brandwine |
| 9,838,425 B2 | 12/2017 | Jalan et al. |
| 9,892,284 B2 | 2/2018 | Wachendorf et al. |
| 10,084,791 B2 | 9/2018 | Chien |
| 10,171,463 B1 | 1/2019 | Wiger |
| 10,250,868 B1 * | 4/2019 | Arnold .................. H04N 9/045 |
| 2002/0049883 A1 | 4/2002 | Schneider et al. |
| 2002/0133721 A1 | 9/2002 | Adjaoute |
| 2002/0188704 A1 | 12/2002 | Gold et al. |
| 2003/0101357 A1 | 5/2003 | Ronen et al. |
| 2003/0118038 A1 | 6/2003 | Jalava et al. |
| 2003/0084349 A1 | 8/2003 | Friedrichs et al. |
| 2003/0149668 A1 | 8/2003 | Lee et al. |
| 2003/0149887 A1 | 8/2003 | Yadav |
| 2003/0149888 A1 | 8/2003 | Yadav |
| 2003/0185395 A1 | 10/2003 | Lee et al. |
| 2003/0188190 A1 | 10/2003 | Aaron et al. |
| 2003/0217289 A1 | 11/2003 | Ammon et al. |
| 2004/0003285 A1 | 1/2004 | Whelan et al. |
| 2004/0068562 A1 | 4/2004 | Tilton et al. |
| 2004/0088537 A1 | 5/2004 | Swander et al. |
| 2004/0123141 A1 | 6/2004 | Yadav |
| 2004/0123157 A1 | 6/2004 | Alagna et al. |
| 2004/0162992 A1 | 8/2004 | Sarni et al. |
| 2004/0186850 A1 | 9/2004 | Chowdhury et al. |
| 2004/0187034 A1 | 9/2004 | Tamura et al. |
| 2004/0255151 A1 | 12/2004 | Mei et al. |
| 2005/0047355 A1 | 3/2005 | Wood et al. |
| 2005/0060412 A1 | 3/2005 | Chebolu et al. |
| 2005/0076222 A1 | 4/2005 | Olkin et al. |
| 2005/0144279 A1 | 6/2005 | Wexelblat |
| 2005/0172229 A1 | 8/2005 | Reno et al. |
| 2005/0228899 A1 | 10/2005 | Wendkos et al. |
| 2006/0021031 A1 | 1/2006 | Leahy et al. |
| 2006/0031412 A1 | 2/2006 | Adams et al. |
| 2006/0059092 A1 | 3/2006 | Burshan et al. |
| 2006/0059136 A1 | 3/2006 | Wooldridge et al. |
| 2006/0059238 A1 | 3/2006 | Slater et al. |
| 2006/0059337 A1 | 3/2006 | Poyhonen et al. |
| 2006/0069697 A1 | 3/2006 | Shraim et al. |
| 2006/0069782 A1 | 3/2006 | Manning et al. |
| 2006/0123464 A1 | 6/2006 | Goodman et al. |
| 2006/0123478 A1 | 6/2006 | Rehfuss et al. |
| 2006/0146816 A1 | 7/2006 | Jain |
| 2006/0168022 A1 | 7/2006 | Levin et al. |
| 2006/0190993 A1 | 8/2006 | Noble |
| 2006/0203807 A1 | 9/2006 | Kouretas et al. |
| 2006/0212931 A1 | 9/2006 | Shull et al. |
| 2006/0224742 A1 | 10/2006 | Shahbazi |
| 2006/0230039 A1 | 10/2006 | Shull et al. |
| 2006/0230272 A1 | 10/2006 | Lawrence et al. |
| 2006/0230452 A1 | 10/2006 | Field |
| 2006/0253903 A1 | 11/2006 | Krumel |
| 2007/0006305 A1 | 1/2007 | Florencio et al. |
| 2007/0022479 A1 | 1/2007 | Sikdar et al. |
| 2007/0050377 A1 | 3/2007 | Srivastava et al. |
| 2007/0083670 A1 | 4/2007 | Kelley et al. |
| 2007/0268837 A1 | 11/2007 | Melton et al. |
| 2008/0071953 A1 | 3/2008 | Kershaw et al. |
| 2008/0077995 A1 | 3/2008 | Curnyn |
| 2008/0104186 A1 | 5/2008 | Wieneke et al. |
| 2008/0147837 A1 | 6/2008 | Klein et al. |
| 2008/0172382 A1 | 7/2008 | Prettejohn |
| 2008/0271118 A1 | 10/2008 | Greenlaw |
| 2009/0043765 A1 | 2/2009 | Pugh |
| 2009/0077616 A1 | 3/2009 | Lindholm et al. |
| 2009/0185523 A1 | 7/2009 | Allen et al. |
| 2009/0271625 A1 | 10/2009 | Kolluru et al. |
| 2009/0287844 A1 | 11/2009 | Bailey |
| 2009/0300759 A1 | 12/2009 | Wang et al. |
| 2009/0311963 A1 | 12/2009 | Haverty |
| 2010/0050255 A1 | 2/2010 | Upadhyay et al. |
| 2010/0131756 A1 | 5/2010 | Schneider |
| 2010/0132018 A1 | 5/2010 | Takala et al. |
| 2010/0241836 A1 | 9/2010 | Proudler |
| 2010/0325424 A1 | 12/2010 | Etchegoyen |
| 2011/0113249 A1 | 5/2011 | Gelbard et al. |
| 2011/0113476 A1 * | 5/2011 | Moutarazak ............ G06F 21/34 726/6 |
| 2012/0077480 A1 | 3/2012 | DeLuca |
| 2012/0084549 A1 | 4/2012 | Mackintosh et al. |
| 2012/0158541 A1 | 6/2012 | Ganti et al. |
| 2013/0013905 A1 | 1/2013 | Held et al. |
| 2013/0198065 A1 | 8/2013 | McPherson et al. |
| 2013/0252604 A1 | 9/2013 | Huber et al. |
| 2013/0301833 A1 | 11/2013 | Wong |
| 2013/0318573 A1 | 11/2013 | Reunamaki et al. |
| 2013/0346628 A1 | 12/2013 | Canion et al. |
| 2014/0006579 A1 * | 1/2014 | Pitsch .................... H04L 67/02 709/223 |
| 2014/0189808 A1 * | 7/2014 | Mahaffey .............. H04L 63/083 726/4 |
| 2014/0244991 A1 | 8/2014 | Akdemir et al. |
| 2014/0258465 A1 | 9/2014 | Li |
| 2014/0313975 A1 | 10/2014 | Berenberg et al. |
| 2014/0325588 A1 | 10/2014 | Jalan et al. |
| 2015/0020214 A1 | 1/2015 | Copsey |
| 2015/0026784 A1 | 1/2015 | Kurkure |
| 2015/0082438 A1 | 3/2015 | Prieto Alvarez et al. |
| 2015/0089621 A1 * | 3/2015 | Khalid ................ H04L 63/0807 726/9 |
| 2015/0089625 A1 | 3/2015 | Swanson et al. |
| 2015/0188714 A1 | 7/2015 | Leoutsarakos et al. |
| 2015/0213131 A1 | 7/2015 | Styler et al. |
| 2015/0229609 A1 | 8/2015 | Chien |
| 2015/0256546 A1 | 9/2015 | Zhu et al. |
| 2015/0372978 A1 | 12/2015 | Bharrat et al. |
| 2016/0021610 A1 | 1/2016 | Wan et al. |
| 2016/0142393 A1 | 5/2016 | Wang et al. |
| 2016/0261601 A1 | 9/2016 | Zhou et al. |
| 2017/0011219 A1 | 1/2017 | Li et al. |
| 2017/0034193 A1 * | 2/2017 | Schulman ........... H04L 63/1425 |
| 2017/0118210 A1 | 4/2017 | Athias |
| 2017/0185790 A1 | 6/2017 | Gauda |

(56) References Cited

U.S. PATENT DOCUMENTS

| | | | |
|---|---|---|---|
| 2017/0332307 | A1 | 11/2017 | Pan |
| 2017/0334522 | A1* | 11/2017 | Zahid ................. B62J 6/00 |
| 2017/0364685 | A1 | 12/2017 | Shah et al. |
| 2018/0020002 | A1 | 1/2018 | Duca et al. |
| 2018/0097843 | A1 | 4/2018 | Bursell et al. |
| 2018/0131719 | A1 | 5/2018 | Amit et al. |
| 2018/0189478 | A1 | 7/2018 | Richardson et al. |
| 2019/0089533 | A1* | 3/2019 | Agnello ............ H04L 63/0823 |
| 2019/0190723 | A1* | 6/2019 | Lee ................. H04L 9/3231 |

FOREIGN PATENT DOCUMENTS

| | | |
|---|---|---|
| WO | 2017/035159 | 3/2017 |
| WO | 2017/112641 | 6/2017 |
| WO | 2018/063583 | 4/2018 |

OTHER PUBLICATIONS

"Netcraft Toolbar Tutorial," Netcraft Ltd, 4 pages, http://news.netcraft.com/archives/2004/12/29/netcraft_toolbar_tutorial.html (accessed Feb. 8, 2008).

U.S. Patent & Trademark Office, Official Communication for U.S. Appl. No. 11/470,581 dated Mar. 20, 2009, 7 pages.

International Search Report and Written Opinion dated Apr. 23, 2008, which issued during the prosecution of International Patent Application No. PCT/US07/64102.

International Search Report and Written Opinion dated Aug. 21, 2014, which issued during the prosecution of International Patent Application No. PCT/US14/31244.

International Search Report and Written Opinion of the International Searching Authority completed Feb. 12, 2018, in International Patent Application No. PCT/US17/61886, 6 pages.

Supplementary European Search Report completed Jul. 11, 2016, in European Patent Application No. 14836161, 7 pages.

International Search Report and Written Opinion of the International Searching Authority dated Aug. 29, 2019, in International Patent Application No. PCT/USI9/23274, 7 pages.

International Search Report and Written Opinion of the International Searching Authority dated Oct. 18, 2018, in International Patent Application No. PCT/US18/29486, 8 pages.

International Search Report and Written Opinion of the International Searching Authority dated Jul. 25, 2019, in International Patent Application No. PCT/US19/34039, 7 pages.

International Search Report and Written Opinion of the International Searching Authority dated Oct. 12, 2007, in International Patent Application No. PCT/US06/35159, 6 pages.

International Search Report and Written Opinion of the International Searching Authority dated Jan. 31, 2018, in International Patent Application No. PCT/US17/60889, 6 pages.

International Search Report and Written Opinion of the International Searching Authority dated Apr. 23, 2008, in International Patent Application No. PCT/US07/64102, 8 pages.

* cited by examiner

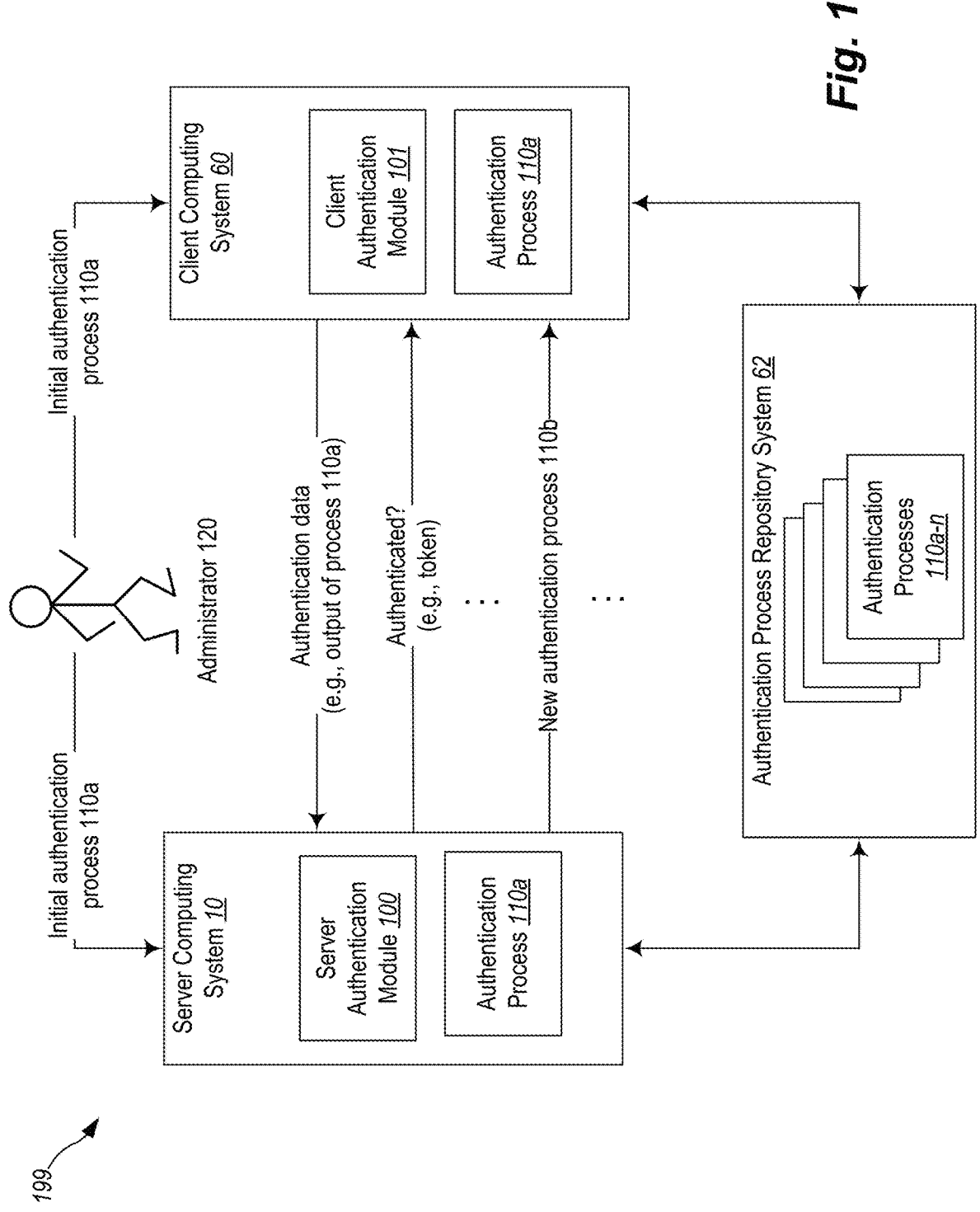

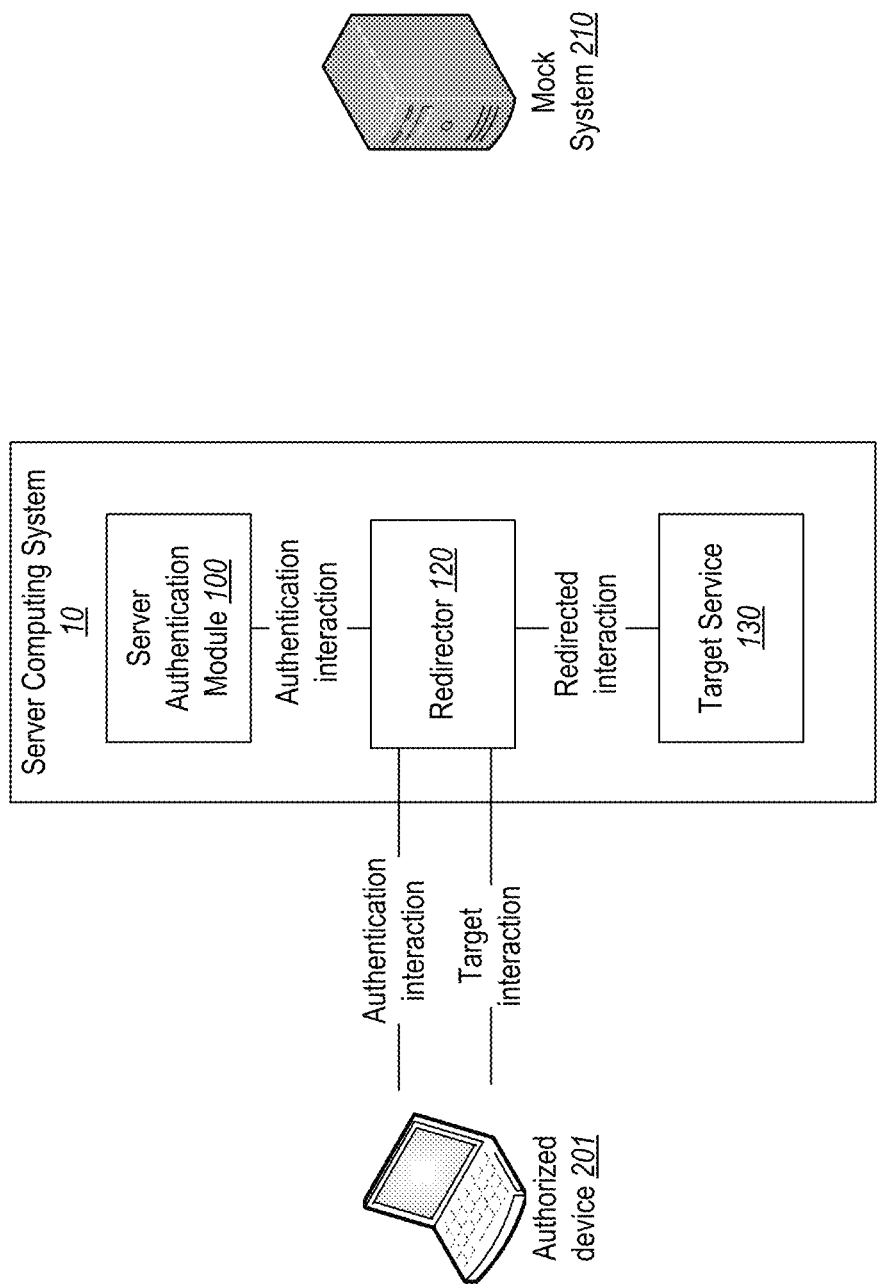

Fig. 3B

3B00: The process of *3A00*, further comprising:

3B01: Determining one or more communication properties of the client computing system

3B02: Authenticating the client computing system only when the one or more communication properties are allowable

3B03: When at least one of the one or more communication properties are not allowable, redirecting network communication from the client computing system to the mock computing system

Fig. 3C

3C00: The process of *3A00*, further comprising:

3C01: Authenticating the client computing system only when (1) the first number matches the second number, (2) a user of the client computing system provides an accepted username and password, (3) a network address associated with the client computing system is included in a list of trusted network addresses, and (4) a non-modifiable identifier of the client computing system is included in a list of trusted device identifiers

Fig. 3D

3D00: The process of 3A00, wherein the associating an indication of a first authentication process with a client computing system includes:

> 3D01: Storing the indicator of the first authentication process in a table in association with an identifier of the client computing system

Fig. 3E

3E00: The process of 3A00, wherein the applying a second authentication process to the first timestamp to generate a second number based on the first timestamp includes:

> 3E01: Applying an operator to the first timestamp and an integer

Fig. 3F

3F00: The process of 3A00, further comprising:

> 3F01: Transmitting to the client computing system an indicator of a third authentication process

> 3F02: In a subsequent authentication interaction with the client computing system, applying the third authentication process to a second timestamp that is later in time than the first timestamp

TIMESTAMP-BASED AUTHENTICATION WITH REDIRECTION

CROSS-REFERENCE TO RELATED APPLICATIONS

This application is a continuation-in-part of U.S. application Ser. No. 16/220,652, titled "Timestamp-based Authentication," filed Dec. 14, 2018, the contents of which is incorporated herein by reference in its entirety.

TECHNICAL FIELD

The present disclosure relates to methods, techniques, and systems for computer security, and more particularly to timestamp-based approaches to authentication that verify the identity of a computing device in addition to its user.

BACKGROUND

Hackers and other malicious parties are increasingly attempting to penetrate computing systems or networks operated by home users, corporations, or governments. In many cases, hackers gain access to systems or networks by using stolen credentials (e.g., user names and passwords) of a legitimate user. For example, a hacker can access lists of usernames and passwords that have been stolen from compromised systems. Since many users use the same password for many different services, the hacker can then try those passwords with other systems.

BRIEF DESCRIPTION OF THE DRAWINGS

FIG. 1 is a block diagram that illustrates interacting authentication modules in a system according an example embodiment.

FIGS. 2A-2D are block diagrams that illustrate authentication and redirection according to example embodiments.

FIGS. 3A-3G are flow diagrams that illustrate authentication processes provided by example embodiments.

DETAILED DESCRIPTION

Figure 2B:
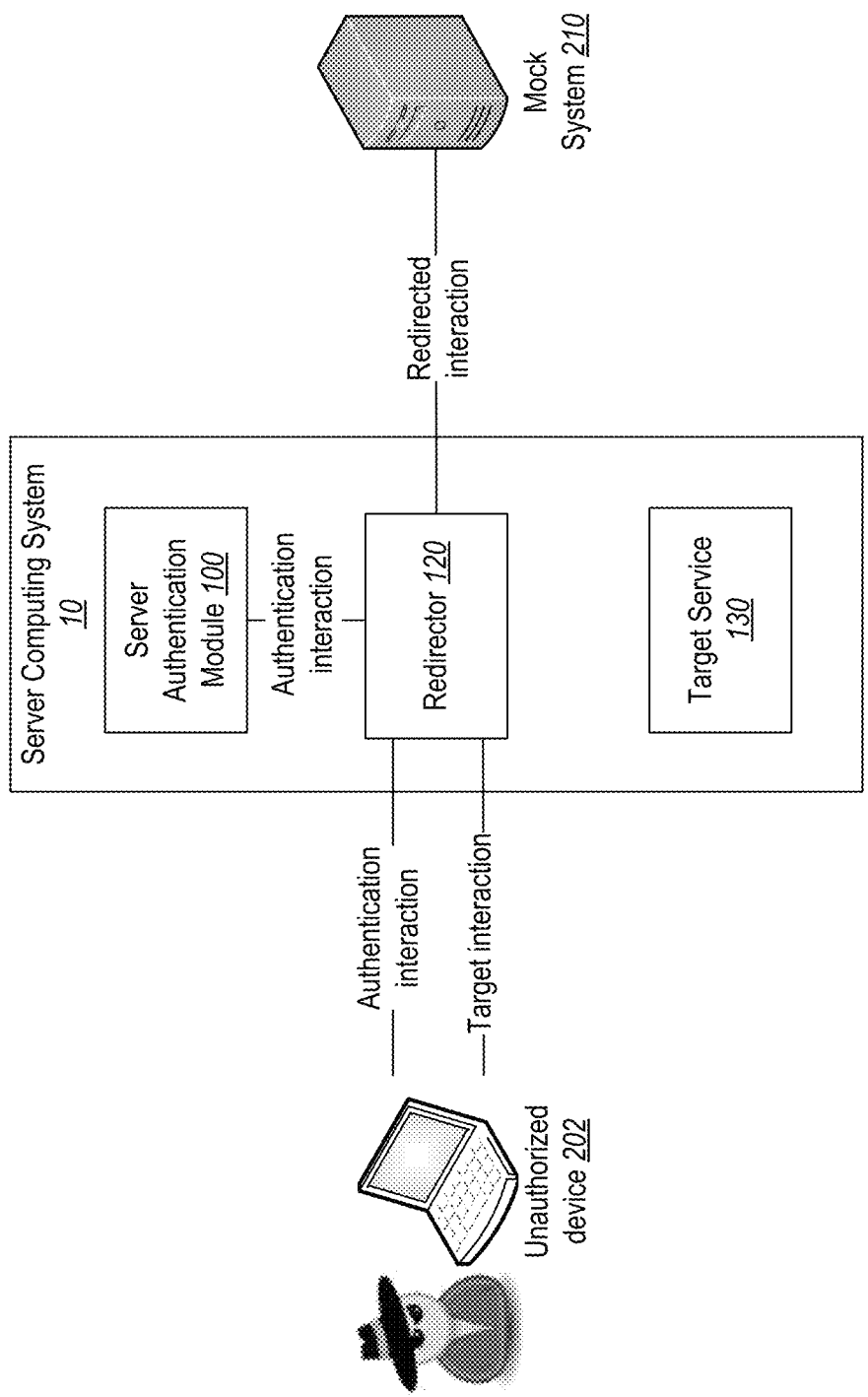

Embodiments described herein provide methods, devices, and systems for computer security, and more particularly timestamp-abased authentication techniques provide an added level of security for systems, services, and organizations. Typical embodiments provide an authentication method that utilizes an authentication process that is shared between a first and second computing system. The identity of the authentication process is a secret that is shared between the two computing systems. The process provides as output a number that is based on a timestamp. The first computing system executes the authentication process using a timestamp obtained from its clock. The resulting number is transmitted to the second computing system, possibly along with other authentication data, such as a username and/or password. In response, the second computing system executes the authentication process using a timestamp obtained from its clock. If the numbers generated by the first and second computing systems match, the first computing system is authenticated.

Authentication can be determined based on other or additional information. For example, a computing system may be authenticated by using the described timestamp-based technique in combination with a username and password verification. As another example, authentication may be based on the timestamp-based technique in combination with a white list or other data structure that specifies properties of allowable network communications, such as allowable IP address ranges, device identifiers (e.g., hardware addresses, MAC identifiers, CPU identifiers), time ranges, geographical location, or the like.

If a computing system or device fails the described authentication technique, a variety of actions are contemplated. Such actions may include closing any network connections, logging the authentication failure, notifying users, or the like. In other embodiments, the attempted communication is redirected to an alternative computing system. The alternative computing system is a "mock system," which masquerades as the actual destination computing system by copying at least some of the function, appearance, structure, and data of the actual destination system. The mock system will often include data that is fake, false, or otherwise inauthentic. In some cases the fake data is specially configured to track its use. For example, the fake data may include a fictional customer lists that includes names, addresses, or numbers with unique spellings or errors that can be used to identify the source of the data. Digital image data may include watermarks or other signals that may be similarly used to track the data.

In typical embodiments, the described first computing system is a client and the second computing system is a server. The client authenticates itself in order to access a service provided by the server. In other embodiments, the client may authenticate itself with the server in order to obtain an authentication token, which can be used to authenticate the client to some other system or service, possibly provided or managed by some third party. In some embodiments, the first and second systems are peers, such as in a network of Internet-enabled consumer devices.

The described techniques improve an existing technology, such as by improving the operation, integration, or efficiency of one or more computing systems. Specifically, the described techniques address shortcomings in current approaches to computer security. Using the described techniques makes it more difficult for a malicious computing system to intrude into a secure service, system, or network. The described techniques restrict access to only those computers or devices that have been configured with the proper authentication processes. The described techniques can be used to verify the identity of the user in addition to the device being used by the user. Thus, even if a malicious party steals a user's login credentials (e.g., username and password), the malicious party will still not be able to access a secure system unless the party has also stolen the user's device.

System Overview

FIG. 1 is a block diagram that illustrates interacting authentication modules in a system according an example embodiment. In FIG. 1, a system 199 includes a server computing system 10, a client computing system 60, and an authentication process repository system 62. The server 10 includes a server authentication module 100 and an authentication process 110a. The client 60 includes a client authentication module 101 and the same authentication process 110a. The repository system 62 includes multiple authentication processes 110a-110n.

In some embodiments, the client 60 is a computer that is deployed for interaction with a secure service or network, such as may be provided by a corporation, university, or other organization. When the client 60 is initially configured (e.g., when it is unboxed and configured for its user), an administrator 120 or other privileged user stores an indication of an initial authentication process 110a on the client 60 and the server 10. This may be done manually, such as by inputting an identifier of an authentication process. In other embodiments, the indication of the authentication process 110a may be transmitted to the client and/or server over a secure channel. In response, the client 60 and server 10 each obtain and store the identified authentication process 110a from the repository system 110a-n. The client 60 is then ready to use the authentication process 110a during authentication interactions with the sever 10, as described below.

In typical embodiments, authentication processes take as input a timestamp and output a number based on the timestamp. An example process may be expressed as K=a*timestamp+b, where a and b are constants stored as part of the authentication process. In some embodiments, the constants a and b are fixed or static parts of the process, whereas in other implementations, the constants are configuration data that is specified when the process is selected or stored. Other embodiments may use other or additional operators (e.g., subtraction, exponentiation, modulo, etc.) to compute the output based on the timestamp.

The client 60 authenticates itself to the server 10 as follows. First, the client obtains a timestamp reflecting the current time from a hardware or software clock. The clock is typically local to the client 60 but may in some embodiments be a network-accessible time server. The client 60 then applies the authentication process 110 to the timestamp to obtain a number used as an authentication key. For example, if the timestamp is 1544512669, and if the process 110 applies the function K=34*timestamp+54543, the resulting value would be 52513485289. The determined number is then transmitted by the client 60 to the server 10 as authentication data. The authentication data may include other information, such as a username and password (or hash thereof). The authentication data may also or instead include device identifiers, such as MAC addresses, CPU identifiers, or the like.

When the server 10 receives the authentication data from the client 60, the server 10 computes an authentication number in the same way as the client 60. The server 10 first determines the correct authentication process to utilize, by looking up the process 110a in a table or database that associates clients with authentication processes. The server 10 will typically have a table that maps clients to their respective authentication processes, so that different processes can be employed for each client. In some embodiments, this table maps a non-modifiable device identifier of the client (e.g., MAC address, CPU identifier) to an identifier of the authentication process. The server 60 receives the device identifier as part of the authentication data, via a separate network transmission, or otherwise as part of an initial network handshake or other network protocol related operation.

The server 10 then obtains a timestamp from a clock and applies process 110 to the timestamp to obtain a number. This number is compared to the number received from the client 60. If the numbers (and password and other identifiers if present) match, the client 60 is authentic. The sever 10 then notifies the client 60 that it has been authenticated. In some embodiments, this notification includes a token that the client 60 can use with the server 10. This token may also or instead be used with another system or service in that requires authenticated access managed by the server 10. For example, the server 10 can provide an authentication service that is used by other (possibly third-party) systems or organizations.

The timestamps used by the server 10 and client 60 may not be the same, due to network transmission latencies, clock drift, or the like. To account for such variations, the authentication process 110 may reduce the precision of the time stamp to a larger time interval. For example, if the timestamp is expressed in seconds, the authentication process 110 may round, floor, or ceiling the timestamp to the nearest 10-second interval (e.g., by dropping the ones digit). Also, to account for client and server timestamps that transition across the boundaries of a time interval, the server 10 may apply the process 110 to timestamps reflecting the current as well as the previous time interval. As an example, suppose the timestamp obtained by the client is 1239, and that the authentication process drops the ones digit before applying its function. Using K=34*modified timestamp+42 yields 34*123+42=4224. If the timestamp obtained by the server 10 is one second later (1240), the server will generate K=34*124+42=4258, which does not match the number received from the client 60. But if the server 10 also checks the prior time interval (123), it will obtain a number (34*123+42=4224) that matches the number received from the client 60. In other embodiments, the client 60 may instead transmit two numbers, one based on the current time interval and a second based on the next future time interval. The server 10 then checks both of these against its number based on the current time, and authenticates the client 60 if either numbers match the server's number.

The authentication process may be modified or altered from time to time or upon the occurrence of an event. For example, the server 10 may instruct the client 60 to use a new authentication process after every n-th authentication, after a passage of time (e.g., 24 hours), at a fixed date (e.g., Jan. 1, 2020), or the like. By changing the authentication process it becomes more difficult for a malicious party to recover the number-generating function at the heart of the described techniques.

The repository system 62 stores and provides authentication processes for use by other devices and systems. The system 62 is in some embodiments a public repository. Because the described techniques in some embodiments rely on keeping the identity of the specific authentication method secret, the details of the different authentication processes may be public. In such embodiments, the system 62 will typically host many (e.g., millions) authentication processes, so that a malicious party cannot try them all by brute force. Also, or alternatively, each authentication process may utilize configurable constants or other inputs that can also be kept as secret between the client and server. In some embodiments, the authentication processes are themselves private. For maximum security, the authentication processes are only shared between machines and systems within an organization. For example, a corporation can establish a secret set of authentication processes that is used only for purposes of authenticating employee devices. This set may be stored in a secure shared repository or loaded directly onto each device. Because an authentication process can be represented as a small number of constants and operators, a very large number of processes can be represented quite compactly.

In some embodiments, the described techniques are employed to authenticate users and their devices in the context of a corporate or organizational network. In other contexts, the techniques can be employed in the context of an online Web-based service. In such embodiments, each time a user signs up for a Web service, the service provides an indication of an initial authentication process to use. The user's client device maintains a table that maps Web services to authentication processes, so that the correct authentication process can be employed based on the Web service the user is accessing. Further, as noted above, these techniques can be combined with others that use device identifiers (e.g., MAC or CPU identifiers) to verify the identity of devices when accessing secure systems. Such techniques are described in U.S. Patent Application Pub. No. 2018/ 0146001, entitled "Network Security based on Device Identifiers and Network Addresses," filed Nov. 22, 2016, which is incorporated herein by reference in its entirety.

Note that there is effectively no limit to the number of different authentication processes that may be created and/or used. Some embodiments provide a multitude (e.g., millions) of different authentication processes, of which different subsets may be employed by different corporations, organizations, or the like. This allows each organization flexibility and uniqueness with respect to other organizations. Each organization can thus implement its own policies for selecting, replacing, and updating authentication processes.

Note that the described authentication techniques can be performed without user interaction. In particular, the authentication module can automatically and without user intervention apply the appropriate authentication process, transmit the resulting number (possibly along with other, cached login credentials or tokens) to the server, and so on. In this way, the techniques may be completely transparent to the user. Furthermore, the techniques may be implemented at different levels of the protocol stack in different embodiments. For example, one embodiment may perform the authentication interaction at the application layer, such as via an HTTP connection. Another embodiment may perform the authentication interaction at a lower layer, such as layer 2 (data link) or 3 (network).

Figure 2C:
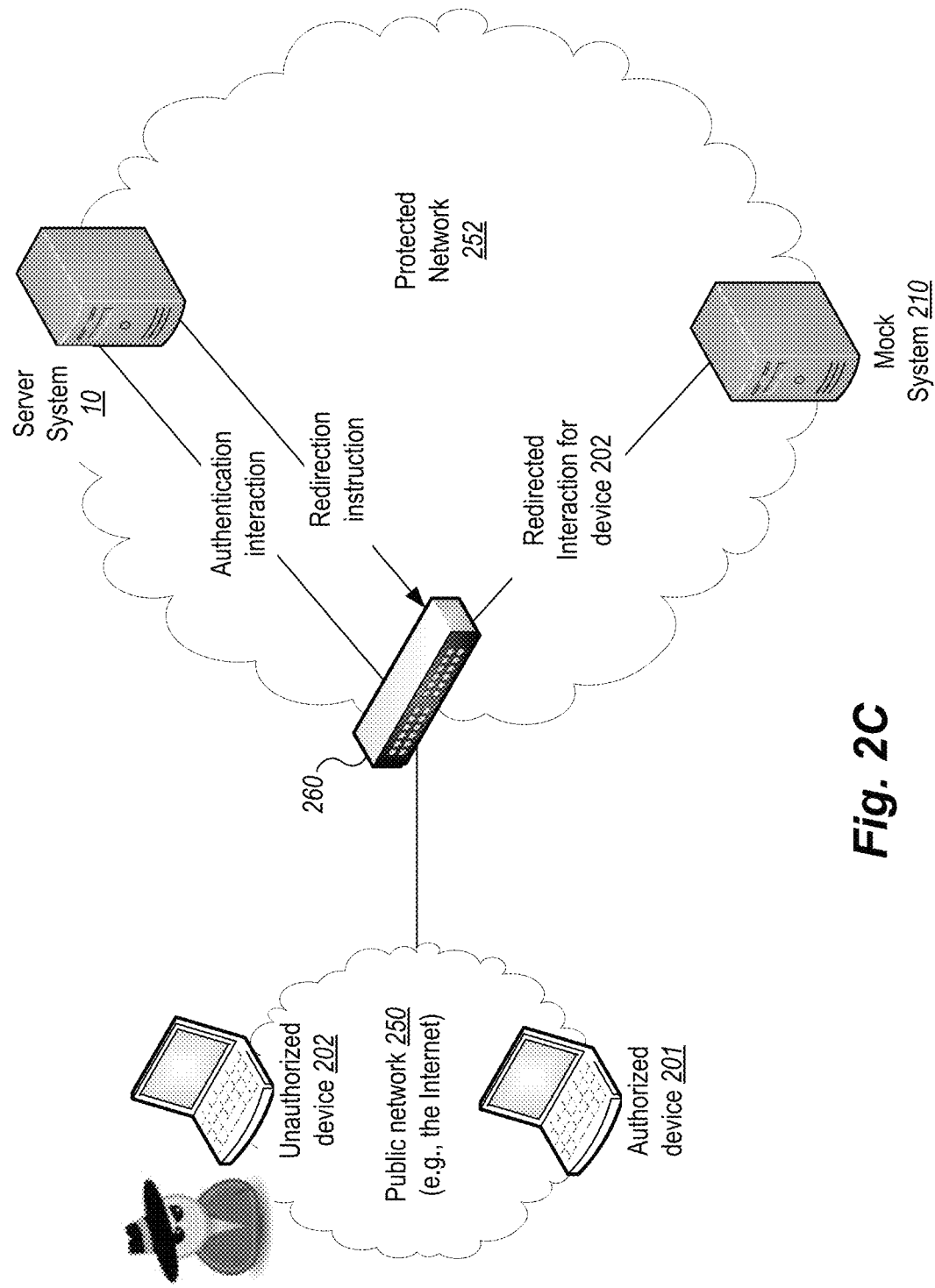
Figure 2D:
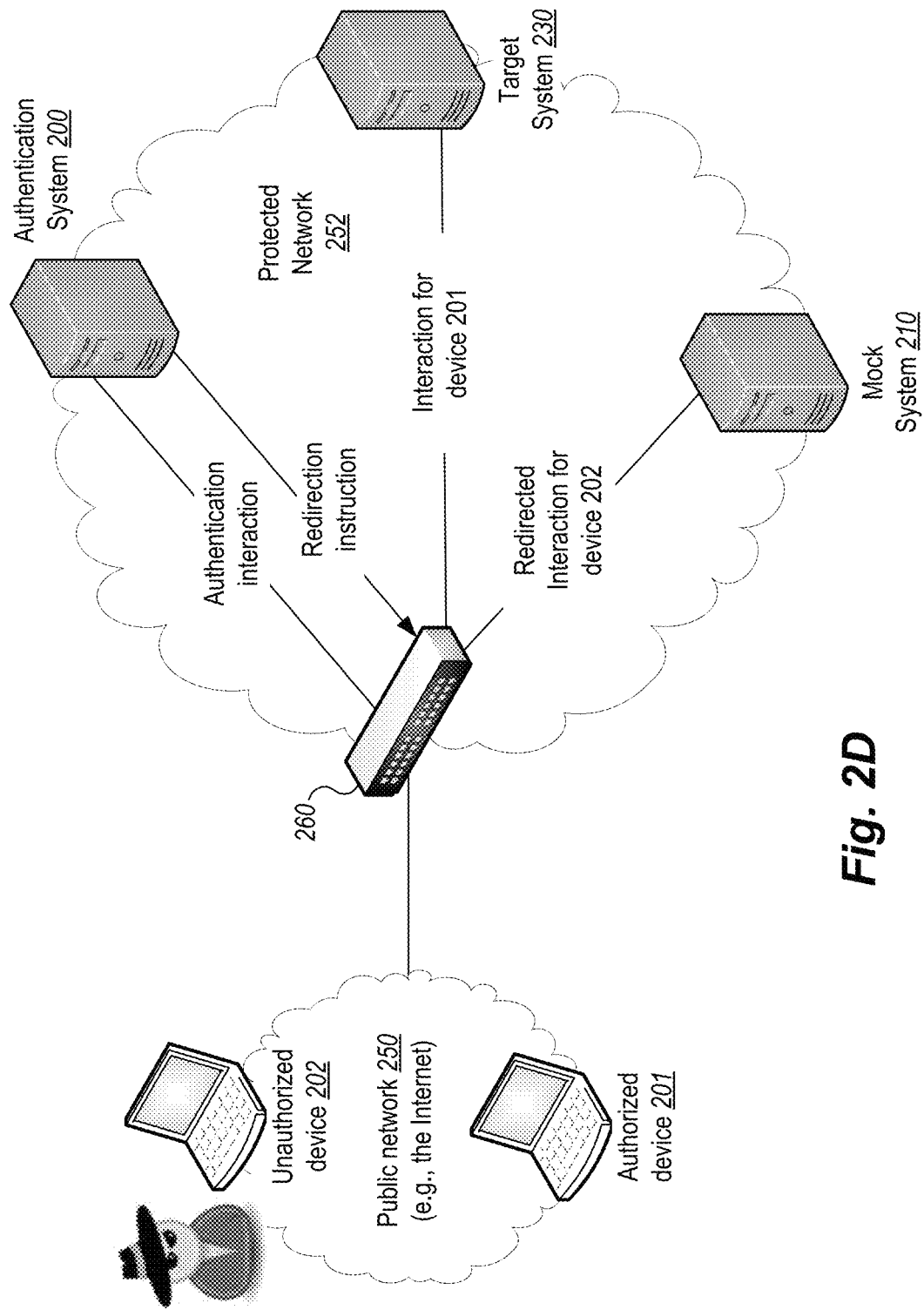

FIGS. 2A-2D are block diagrams that illustrate authentication and redirection according to example embodiments. By way of overview, FIG. 2A illustrates redirection in an example authorized interaction, while FIG. 2B illustrates redirection an example unauthorized interaction. FIG. 2C shows a variation where redirection of unauthorized interactions is performed by a networking device, such as a router or firewall. FIG. 2D illustrates another variation in which the authentication and target services are performed by distinct computing systems.

FIG. 2A illustrates redirection in an example authorized interaction. FIG. 2A depicts an authorized computing device 201 interacting with a server computing system 10, such as is described in FIG. 1, above. The server 10 includes an authentication module 100, a redirector 120 and a target service 130. The authorized device 201 is attempting to interact with the target service 130. The target service 130 may be any network-accessible service provided by the server 10, such as a Web page, Web app, network accessible API, or the like.

The authorized device 201 engages in an authentication interaction with the authentication module 100 as described above. Since the device 201 is authorized, the authentication module 100 instructs the redirector 120 to redirect subsequent accesses by the authorized device 201 to the target service 130. An instruction from the module 100 can take various forms, including an explicit command that redirects communication to the target service 130; a response code that indicates that the authentication was successful; or the like. Redirection may be accomplished in various ways depending on the embodiment. For example, redirection may be performed by control logic in a server application that redirects application control depending on whether a network communication is authorized, such as by determining whether it includes a proper authorization token. In other embodiments, redirection may be performed by rerouting network packets, such as is described in additional detail below.

FIG. 2B illustrates redirection an example unauthorized interaction. FIG. 2B depicts an unauthorized computing device 202 interacting with the server computing system 10. As in FIG. 2A, the device 202 initially attempts to authenticate by interacting with the authentication module 100. When the authentication fails, the module 100 instructs the redirector 120 to redirect any further interactions with the mock system 210. In addition to the discussion provided herein, redirection techniques are further described in U.S. patent application Ser. No. 15/465,315, entitled "Network Security based on Redirection of Questionable Network Accesses," and filed Mar. 21, 2017, which is incorporated herein by reference in its entirety.

Network communication can be redirected in various ways. In some embodiments, a packet can be redirected by transmitting the packet to a different host/network. In such cases, the destination address of the packet may need to be modified. In other embodiments, an application-level redirect can be employed, such as an HTTP redirect. For example, the authentication module 100 may be utilized by an application executing on a Web server. In this context, a questionable communication may be one that comes from a disallowed source IP address (e.g., obtained from the TCP/IP stack). Instead of serving a requested page to the unauthorized device 202, the Web server responds with an HTTP redirect (e.g., response code 301) that causes the device 202 to interact with the mock system 210 instead.

The mock computing system 210 is a computing system that masquerades, simulates, and/or mimics at least some of the behavior, structure, and function of the target service 130. The mock system 210 may provide substantially or totally the same functions as the target service 130, but instead store or provide false or fake data, such as personal information (e.g., credit card information, social security number), company data (e.g., company trade secrets, financial data, classified data), national security data, or the like. The provided data may be designed to mislead, fool, confuse, or track the malicious user. As noted above, some of the fake data may be specially configured to track its use at a later time. For example, personal information may include intentional misspellings that can be identified ata later time. As another example, digital image, audio, or video content may include watermarks or other signals that are not perceptible to humans, but that can uniquely identify the content as having been obtained from the mock system 803 without authorization.

The mock computing system 210 is typically configured to track the network communication from the unauthorized device 202. Tracking the communication can include logging, recording, or otherwise monitoring the actions of the unauthorized device 202.

In some cases, the mock computing system 210 will attempt to initiate a "counter-attack" against the unauthorized device 202. For example, the mock system 210 may attempt to use the network communication to penetrate the security of the questionable device (e.g., by causing a buffer overflow, script injection, or the like) in order to install program code (e.g., a rootkit, Trojan, worm) that can be used to monitor or control the operation of the unauthorized device 202.

In some embodiments, the mock system 210 will be a virtual machine. Some embodiment utilize a collection of virtual machines to serve as mock systems. These virtual machines can be allocated based on various factors, such as the source IP address of the communication, so that a given attacker will always be directed to a given virtual machine, even upon a later access. Also, the use of virtual machines allows different attackers to be redirected to different mock computing systems.

FIG. 2C shows a variation where redirection of unauthorized interactions is performed by a networking device, such as a router or firewall. This example differs from those of FIGS. 2A and 2B in that the redirection of unauthorized communication is performed by a computing device that is separate and distinct from the server computing system 10. In this example, devices 201 and 202 are attempting to interact with a protected network 252, which includes the server system 10, the mock system 210, and a networking device 260. The device 260 may be a router, firewall, switch, server or the like.

In the illustrated example, the networking device 260 at a minimum executes a redirection module (e.g., like module 120) that is responsible for directing incoming communications to either the server system 10 or the mock system 210, possibly based upon instructions received from the server system 10 (or some other device/system). In other embodiments, the device 260 also executes an authentication module that can determine whether a given communication is authorized by using the described timestamp-based authentication scheme, possibly combined with other communication properties, such as source IP address, geographic location, time of day.

By way of example, both devices 201 and 202 attempt to interact with server system 10, such as by opening a new TCP/IP connection to the server 10. Network packets comprising new communications or interactions are redirected by device 260 to the system 10 for authentication, as described herein. If the authentication fails (as in the case of device 202), the system 10 instructs the device 260 to redirect any further packets originating from the unauthorized device to the mock system 210. Otherwise, if the authentication is successful (as in the case of device 201) the system 10 instructs the device 260 to continue pass along packets originating from the authorized device to the system 10.

In some embodiments, the system 10 does not provide any kind of instruction to the device 260. In such embodiments, the device 260 may redirect accesses based on the presence or absence of an authentication token. For example, new communications that do not include a token may be routed to the system 10. If the communication is authenticated (device 201), the system 10 provides the authorized device 201 a valid token. If on the other hand the communication cannot be authentication (device 202), the system 10 provides the unauthorized device 202 a specially formatted token that is be recognized by the device 260 as requiring redirection.

In some cases, both the authentication and redirection logic are located at the device 260. For example, such an approach could be taken for a firewall that implements a virtual private network (VPN). To access the protected network 252, devices 201 and 202 must first establish a VPN with the device 262. Setting up the VPN requires one or more of a username/password, timestamp-based authentication, device identifiers, or other factors or properties as discussed herein. The unauthorized device 202 may be allowed to access the network 252, but all of its communications will be redirected to the mock system 210.

FIG. 2D illustrates another variation in which the authentication and target services are performed by distinct computing systems. The scenario in FIG. 2D is similar to that of FIG. 2C, except that authentication is performed by authentication system 200 and the target service is provided by target system 230. FIG. 2D emphasizes that the services and physical (or virtual) machines may be organized in various ways. In typical Microsoft Windows implementations, authentication is performed by a domain controller, which in many cases will reside on a computing system (e.g., system 200) that is distinct from those systems that provide network accessible services (e.g., system 230). Other embodiments, the devices 201 and 202 may never interact directly with authentication system 200. Instead, when those devices interact with target system 230, the target system will itself interact with the authentication system 200 on behalf of the devices 201 and 202.

As noted above, some embodiments may further base authentication upon the existence of one or more trusted device identifiers. The device identifier may be a non-modifiable identifier that is typically a hardware identifier, such as an identifier or serial number burned into a CPU, a motherboard, a disk, a video card, a network interface card, MAC address, or the like. The non-modifiable identifier may incorporate multiple hardware identifiers, such as by combining CPU and network card identifiers.

Special measures are taken to assure that non-modifiable identifiers cannot be manipulated or forged. In typical embodiments, all authorized devices are controlled by the company or other entity (e.g., government agency) that manages the network. Authorized devices are typically "locked down," meaning that ordinary users are not granted administrator rights, and therefore cannot perform operations such as modifying the boot sequence, installing or removing software, configuring network settings, running any unauthorized program/script, or the like. In some embodiments, a secure boot procedure is employed, thereby assuring that users cannot modify stored hardware identifiers, tamper with BIOS or other low-level code, boot non-authorized code, or the like. Device identifiers of authorized devices are added to a centralized white list, which is distributed to authentication modules using cryptographic measures (e.g., digital signatures) to ensure authenticity and data integrity.

Different schemes for communicating non-modifiable identifiers are contemplated. In one protocol, when the authentication module receives and verifies a first packet from a given source address, the module transmits a message to the device at that source address. The message instructs the device to provide the non-modifiable identifier of the device in every subsequent communication (e.g., packet). Subsequent packets are checked for authorized source address and device identifiers.

In another protocol, when the authentication module receives and verifies a first packet from a given source address, the module transmits a request to the device at that source address to also provide the non-modifiable identifier of the device. The device responds by transmitting the identifier, which can then be verified by the authentication module. Once the identifier is verified, the authentication module may allow a certain number (or time period) of packets from the given source address without renewing the request for the device identifier. For example, the authentication module may require the device identifier every 100 packets, every minute, or on some other schedule (e.g., random windows). Such an approach minimizes the impact on network latency and throughput, since only a fraction of packets trigger the device identifier verification operation, which typically requires an additional network round trip to obtain the information from the remote device. The fraction of packets that are "audited" by the authentication module is configurable, so that different levels of security are attainable.

In some embodiments, transmitted device identifiers are encrypted and/or digitally signed by the transmitting device. Encrypting the device identifier ensures that it is not possible for a malicious user to eavesdrop and thereby gain access to authorized device identifiers. Digitally signing the device identifier allows the authentication module to verify that the device identifier was indeed provided by the authorized device and not some third party.

In some embodiments, information, properties, rules, or the like that used to determine whether to authentication may be organized or stored in one or more white lists or similar data structures/stores. In some cases, one or more white lists map IP addresses (or ranges), device identifiers, users, or the like to associated allowable properties, such as those related to geographic location, dates, times, content types, and the like, in order to provide fine-grained control over the time, place, and manner of communication.

Example Processes

FIGS. 3A-3G are flow diagrams that illustrate authentication processes provided by example embodiments.

Figure 3A:
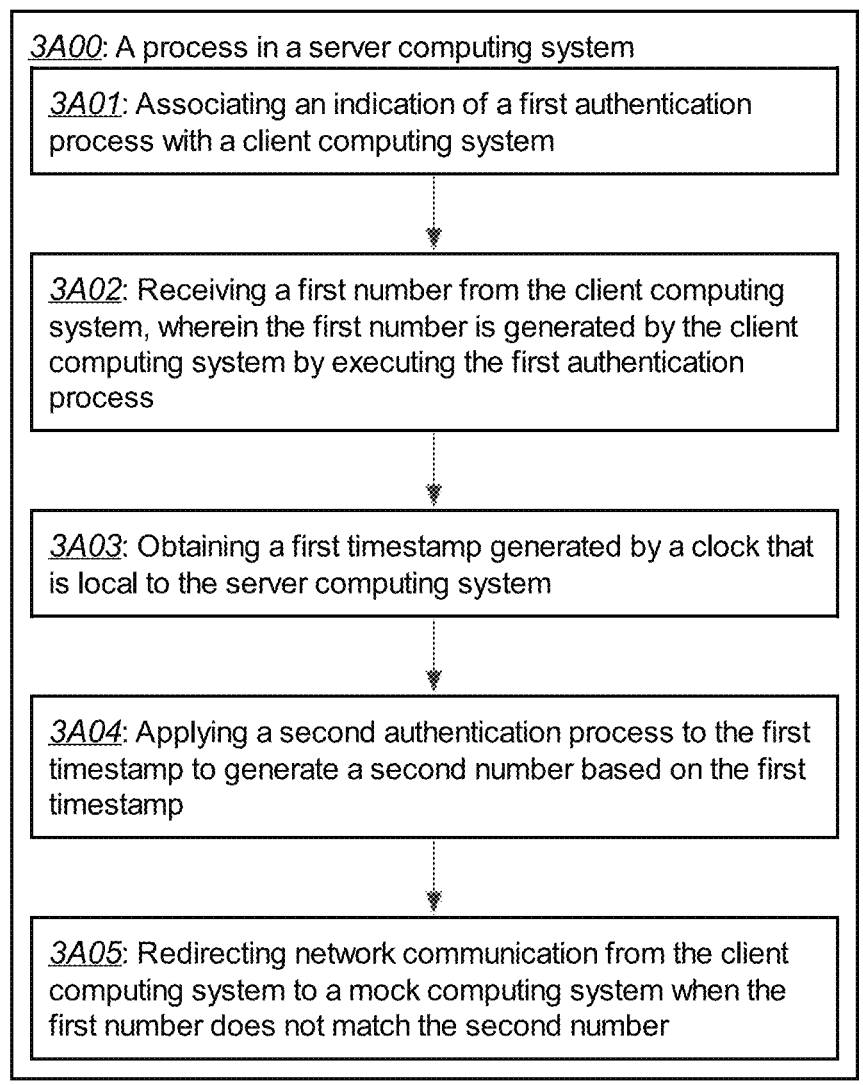

FIG. 3A is a flow diagram of example logic in a server computing system. The illustrated logic in this and the following flow diagrams may be performed by, for example, the server authentication module 100 described with respect to FIG. 1, above. FIG. 3A illustrates a process 3A00 that includes the following block(s).

Block 3A01 includes associating an indication of a first authentication process with a client computing system, wherein the first authentication process takes as input a timestamp and generates as output a number that is based on the timestamp. Typically, the client computing system is assigned an authentication process during initial setup, such as when the client computing system is deployed within an organization that is using the described security mechanism. The authentication process is a function, code block, or similar logic that takes a timestamp (e.g., a 64-bit integer) as input, performs operations on that timestamp, and provides a numerical result as output.

Block 3A02 includes receiving a first number from the client computing system, wherein the first number is generated by the client computing system by executing the first authentication process. The server computing system receives the number as part of an authentication interaction with the client computing system, such as when the client computing system is attempting to access resources of or managed by the server computing system. For example, an employee who operates the client computing system is connecting and logging in to a corporate network that is managed by the server computing system. The number that is received is the output of the authentication process, applied by the client computing system to a timestamp obtained from its local clock.

Block 3A03 includes obtaining a first timestamp generated by a clock that is local to the server computing system. The server computing system next obtains a local timestamp, such as by making the appropriate system call to get a timestamp from the system clock.

Block 3A04 includes applying a second authentication process to the first timestamp to generate a second number based on the first timestamp. The server computing system can determine or identify the second authentication process in various ways. It may look up the second authentication process, such as by examining a table or other mapping that associates client computers with authentication processes. The table typically maps a client identifier, such as a non-modifiable hardware identifier (e.g., MAC address, CPU identifier) to an authentication process. In some embodiments, the authentication processes are public and can be identified by number of other identifier. In other embodiments, the set of authentication processes is kept secret by an organization. The server computing system then applies the second authentication process to the obtained timestamp, which results in the second number, which can in turn be compared to the first number provided by the client computing system.

Block 3A05 includes redirecting network communication from the client computing system to a mock computing system when the first number does not match the second number. The server will authenticate the client computing system only when the number provided by the client computing system matches the number generated locally by the server computing system. When these numbers match, the client and server are using the same authentication process with the same (or substantially the same) input data (timestamp) and any configuration parameters. If the numbers match, the client computing system is authenticated. Otherwise, the client is using the wrong authenticatin process and is likely unauthorized. In this case, subsequent accesses by the client are redirected to the mock computing system.

FIG. 3B is a flow diagram of example logic illustrating an extension of process 3A00 of FIG. 3A. FIG. 3B illustrates a process 3600 that includes the process 3A00, and which further includes the following block(s).

Block 3601 includes determining one or more communication properties of the client computing system. The communication properties can include one or more of a network address (e.g., an IP address), a network port, a time at which the access is occurring, a non-modifiable device identifier (e.g., a MAC address), or the like.

Block 3602 includes authenticating the client computing system only when the one or more communication properties are allowable. In some embodiments, the process stores or accesses a white list or other data structure/store that contains or identifies allowable communication properties, such as network addresses, device identifiers, allowable access times, and the like.

Block 3603 includes when at least one of the one or more communication properties are not allowable, redirecting network communication from the client computing system to the mock computing system. The process then checks the properties of the client communication against the allowable network properties. If one or more of the client properties are not allowable (e.g., a non-allowed IP address), the communication will be redirected to the mock computing system.

FIG. 3C is a flow diagram of example logic illustrating an extension of process 3A00 of FIG. 3A. FIG. 3C illustrates a process 3C00 that includes the process 3A00, and which further includes the following block(s).

Block 3C01 includes authenticating the client computing system only when (1) the first number matches the second number, (2) a user of the client computing system provides an accepted username and password, (3) a network address associated with the client computing system is included in a list of trusted network addresses, and (4) a non-modifiable identifier of the client computing system is included in a list of trusted device identifiers. Some embodiments authenticate based on a combination of additional factors, including network address, device identifier, and username/password. The non-modifiable identifier is typically a hardware identifier, such as an identifier or serial number burned into a CPU, a motherboard, a disk, a video card, a network interface card, MAC address, or the like. The non-modifiable identifier may incorporate multiple hardware identifiers, such as by combining CPU and network card identifiers. If the non-modifiable identifier is not authorized, the client computing system is not authenticated and any further communication is redirected to the mock system.

FIG. 3D is a flow diagram of example logic illustrating an extension of process 3A00 of FIG. 3A. FIG. 3D illustrates a process 3D00 that includes the process 3A00, wherein the associating an indication of a first authentication process with a client computing system includes the following block(s).

Block 3D01 includes storing the indicator of the first authentication process in a table in association with an identifier of the client computing system, wherein the first authentication process is assigned to the client computing system during initial setup, wherein the first authentication process is one of multiple public authentication processes that each generate as output a number that is based on a timestamp. In some embodiments, all authentication processes are public and can be identified by number of other identifier. After selecting and assigning an authentication process to the client computing system, the server computing system will remember this assignment by storing an identifier of the process in a table or similar data structure or repository (e.g., database). As noted above, a client hardware identifier may be used to identify the client computing system. In other cases, the authentication process is associated with a user identifier in addition to or instead of a client hardware identifier.

FIG. 3E is a flow diagram of example logic illustrating an extension of process 3A00 of FIG. 3A. FIG. 3E illustrates a process 3E00 that includes the process 3A00, wherein the applying a second authentication process to the first timestamp to generate a second number based on the first timestamp includes the following block(s).

Block 3E01 includes applying an operator to the first timestamp and an integer, wherein the operator and the integer are specified by the authentication process. Typical authentication processes will operate on the timestamp and at least one other integer using one or more operators. An example process may be expressed as k equals a*timestamp+b, where k is the output number, and where a and b are constants. The constants may be hard coded into the authentication process. In other embodiments, to provide a wider variety of processes, the constants a and b may be selected by the server computing system, such as by selecting two random numbers. These constants are provided to the client computing system and stored by the client and server along with an indication of the authentication process itself. Note that in some embodiments the authentication process may also reduce the precision of the timestamp, such as by rounding or flooring the time to a predetermined time interval (e.g., nearest second, nearest 10-second window, nearest minute). This technique can be used to account for clock drift, communication delays, and/or small differences between the client and server clocks.

FIG. 3F is a flow diagram of example logic illustrating an extension of process 3A00 of FIG. 3A. FIG. 3F illustrates a process 3F00 that includes the process 3A00, and which further includes the following block(s).

Block 3F01 includes transmitting to the client computing system an indicator of a third authentication process. In response to some event, the server computing system will select a new authentication process and instruct the client computing system to use that process in future interactions. Various events/conditions are contemplated, such as selecting a new authentication process on every login, every n-th login, after a passage of time (e.g., every day, week, etc.), at or after a specified date, or the like. By transmitting the indicator of the second authentication process to the client computing system, the server instructs the client to use the second authentication process in subsequent interactions and until a new one is selected at some later time. Some embodiments include client-specific rules for updating the authentication process, so that each client may have a customized or individualized update regimen.

Block 3F02 includes in a subsequent authentication interaction with the client computing system, applying the third authentication process to a second timestamp that is later in time than the first timestamp. The server computing system will use the new authentication process in future interactions with the client computing system.

Figure 3G:
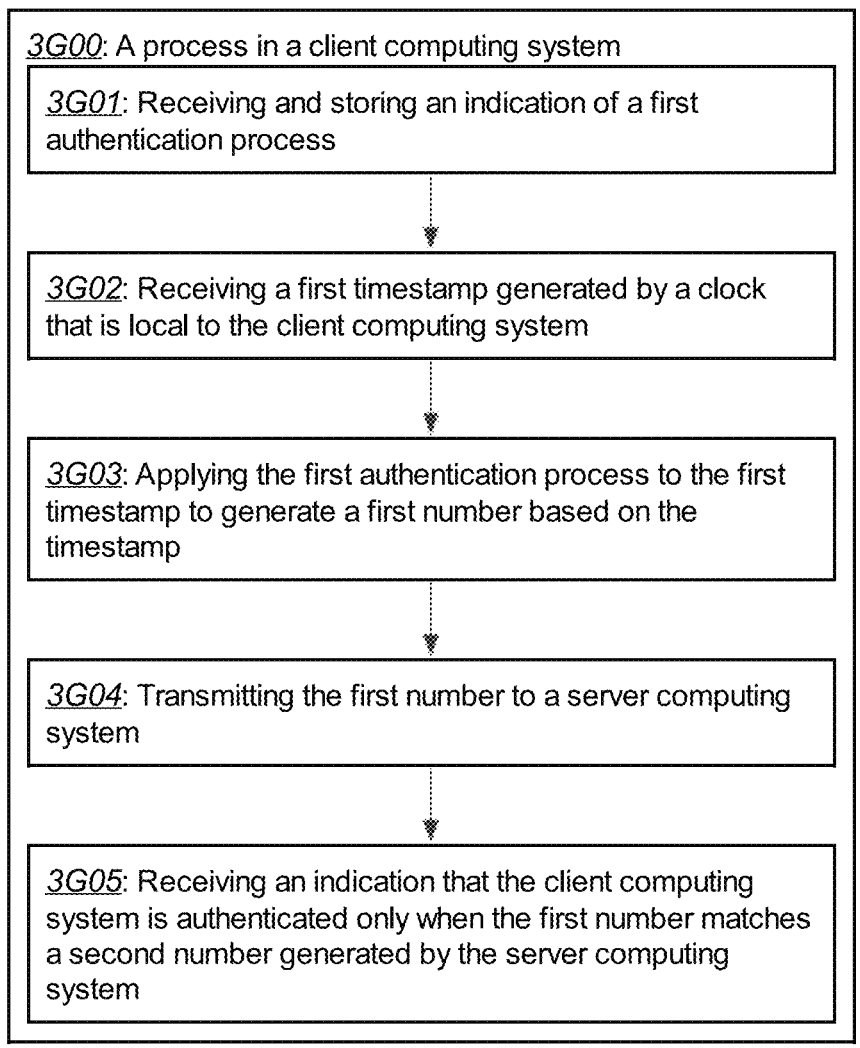

FIG. 3G is a flow diagram of example logic in a client computing system. The illustrated logic in this and the following flow diagrams may be performed by, for example, the client authentication module 101 described with respect to FIG. 1, above. FIG. 3G illustrates a process 3G00 that includes the following block(s).

Block 3G01 includes during initial setup of the client, receiving and storing an indication of a first authentication process that takes as input a timestamp and generates as output a number that is based on the timestamp. In typical scenarios, the client is configured by a user with elevated privilege (e.g., administrator, root user). When the client is initially deployed, the administrator inputs an identifier of the authentication process for storage by the client. The administrator also records this identifier in a user database or other data store (e.g., active directory) so that it can be recalled during later authentication interactions.

Block 3G02 includes receiving a first timestamp generated by a clock that is local to the client computing system. The client obtains the timestamp by making the appropriate system or API call to access the current time from a local hardware or software clock. In some embodiments, a time server may be used instead.

Block 3G03 includes applying the first authentication process to the first timestamp to generate a first number based on the timestamp. The client computing system then applies the authentication process to the obtained timestamp, which results in a number.

Block 3G04 includes transmitting the first number to a server computing system. The number generated by the authentication process is transmitted to the server computing system, possibly along with other authentication information, such as a username and/or password (or a hash thereof). The transmission is typically encrypted so that a malicious party cannot intercept the authentication information.

Block 3G05 includes receiving an indication that the client computing system is authenticated only when the first number matches a second number generated by the server computing system, wherein the second number is generated by the server computing system by applying the first authentication process to a second timestamp generated by a clock that is local to the server computing system. When the transmitted number matches a number that is similarly generated by the server, the server will transmit an indication that the client is authenticated. For example, the server may transmit a token that can be used as an access key. Such tokens are commonly time-limited, meaning that after a certain amount of time (or number of uses) passes, the client will be challenged by the server to re-authenticate itself.

Example Computing System Implementation

Figure 4:
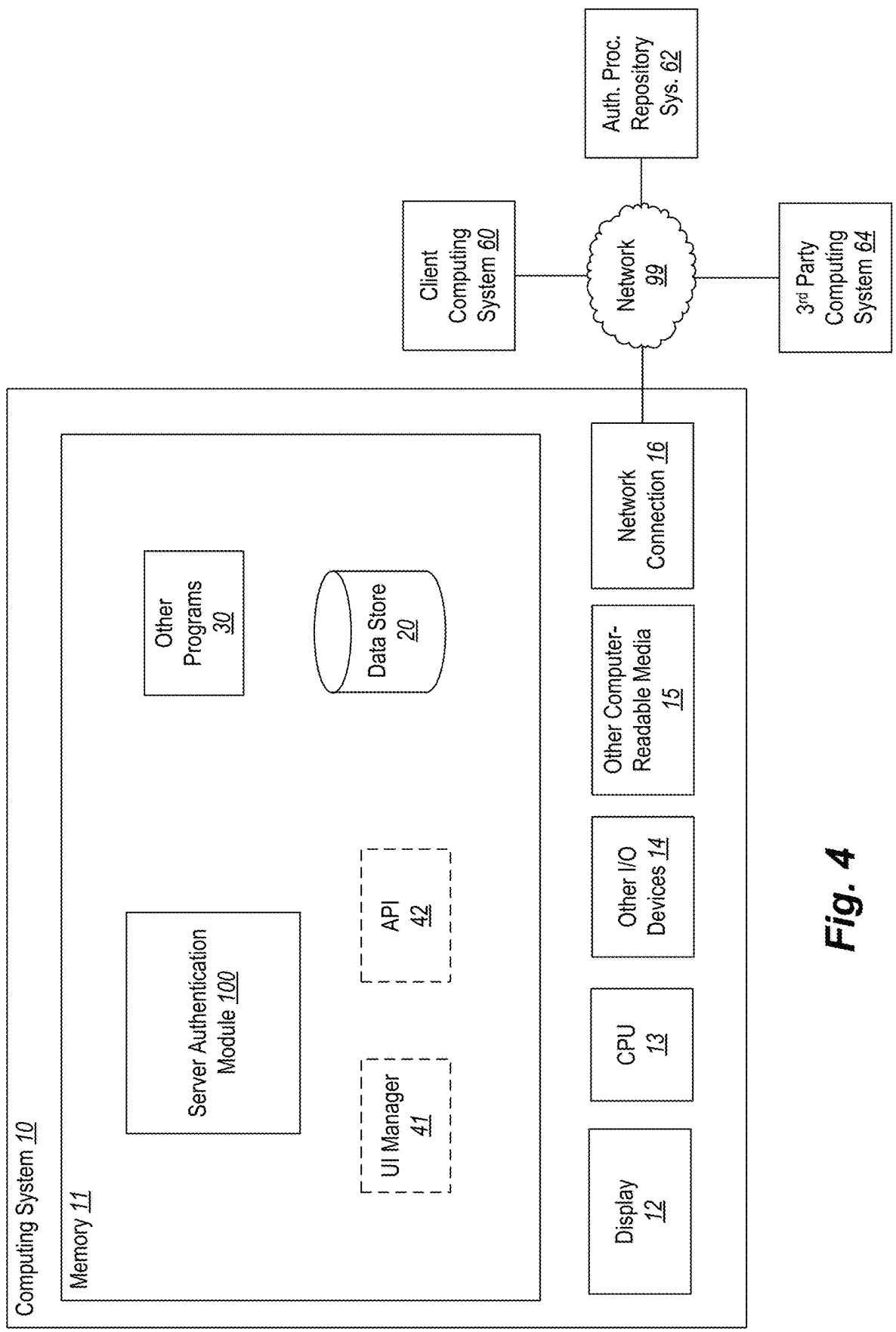
FIG. 4 is a block diagram of a computing system for implementing an authentication module according to an example embodiment.

FIG. 4 is a block diagram of a computing system for implementing an authentication module according to an example embodiment. In particular, FIG. 4 shows a computing system 10 that executes the server authentication module 100 described above. Similar techniques can be applied to implementing the client authentication module 101 described above.

In the embodiment shown, computing system 10 comprises a computer memory ("memory") 11, a display 12, one or more Central Processing Units ("CPU") 13, Input/Output devices 14 (e.g., keyboard, mouse, CRT or LCD display, and the like), other computer-readable media 15, and a network connection 16. The module 100 is shown residing in memory 11. In other embodiments, some portion of the contents, some or all of the components of the module 100 may be stored on and/or transmitted over the other computer-readable media 15. Other modules may also be present in memory 11, such as the redirector 120 and/or the target service 130. The module 100 preferably executes on one or more CPUs 13 and performs the techniques described herein. Other code or programs 30 (e.g., an administrative interface, a Web server, and the like) and potentially other data repositories, such as data repository 20, also reside in the memory 11, and preferably execute on one or more CPUs 13. Of note, one or more of the components in FIG. 4 may not be present in any specific implementation. For example, some embodiments may not provide other computer readable media 15 or a display 12.

The module 100 is shown executing in the memory 11 of the device 10. Also included in the memory 11 are a user interface manager 41 and an application program interface ("API") 42. The user interface manager 41 and the API 42 are drawn in dashed lines to indicate that in other embodiments, functions performed by one or more of these components may be performed externally to the module 100.

The UI manager 41 provides a view and a controller that facilitate user interaction with the module 100 and its various components. For example, the UI manager 41 may provide interactive access to the module 100, such that users or administrators can interact with the module 100. In some embodiments, access to the functionality of the UI manager 41 may be provided via a Web server, possibly executing as one of the other programs 30. In such embodiments, a user operating a Web browser executing on a client system or device can interact with the module 100 via the UI manager 41.

The API 42 provides programmatic access to one or more functions of the module 100. For example, the API 42 may provide a programmatic interface to one or more functions of the module 100 that may be invoked by one of the other programs 30 or some other module. In this manner, the API 42 facilitates the development of third-party software, such as user interfaces, plug-ins, adapters (e.g., for integrating functions of the module 100 into Web applications), and the like.

The module 100 may interact using network connection 16 via a network 99 with other devices/systems including computing systems 60, 62, and 64. The network 99 may be any combination of media (e.g., twisted pair, coaxial, fiber optic, radio frequency), hardware (e.g., routers, switches, repeaters, transceivers), and protocols (e.g., TCP/IP, UDP, Ethernet, Wi-Fi, WiMAX) that facilitate communication between remotely situated humans and/or devices. Computing systems 60, 62, and 64 may be constituted similarly to system 10. In some embodiments, client system 60 authenticates itself to system 10, which in response provides an authentication token that can be used with the third-party computing system 64.

Note that one or more general purpose or special purpose computing systems/devices may be used to implement and/or execute the module 100. However, just because it is possible to implement the module 100 on a general purpose computing system does not mean that the techniques themselves or the operations (taken alone or in combination) required to implement the techniques are conventional or well known. The techniques are not conventional at least because they address and improve an existing technology, such as by improving the operation, integration, or efficiency of one or more computing systems.

In an example embodiment, components/modules of the module 100 are implemented using software programming techniques. For example, the module 100 may be implemented as a "native" executable running on the CPU 13, along with one or more static or dynamic libraries. In other embodiments, the module 100 may be implemented as instructions processed by a virtual machine that executes as one of the other programs 30.

The various components may be implemented using more monolithic programming techniques, for example, as an executable running on a single CPU computer system, or alternatively decomposed using a variety of structuring techniques, including but not limited to, multiprogramming, multithreading, client-server, or peer-to-peer, running on one or more computer systems each having one or more CPUs. Some embodiments may execute concurrently and asynchronously, and communicate using message passing, remote procedure call, or other distributed computing paradigms. Equivalent synchronous embodiments are also supported. Also, other functions could be implemented and/or performed by each component/module, and in different orders, and by different components/modules, yet still achieve the described functions.

In addition, programming interfaces to the data stored as part of the module 100, such as in the data store 20, can be available by language-specific APIs; libraries for accessing files, databases, or other data repositories; through representational languages such as XML; or through Web servers, FTP servers, or other types of servers providing access to stored data. The data store 20 may be implemented as one or more database systems, file systems, or any other technique for storing such information, or any combination of the above, including implementations using distributed computing techniques.

Furthermore, in some embodiments, some or all of the components of the module 100 may be implemented or provided in other manners, such as at least partially in firmware and/or hardware, including, but not limited to one or more application-specific integrated circuits ("ASICs"), standard integrated circuits, controllers executing appropriate instructions, and including microcontrollers and/or embedded controllers, field-programmable gate arrays ("FPGAs"), complex programmable logic devices ("CPLDs"), and the like. Some or all of the system components and/or data structures may also be stored as contents (e.g., as executable or other machine-readable software instructions or structured data) on a computer-readable medium (e.g., as a hard disk; a memory; a computer network or cellular wireless network or other data transmission medium; or a portable media article to be read by an appropriate drive or via an appropriate connection, such as a DVD or flash memory device) so as to enable or configure the computer-readable medium and/or one or more associated computing systems or devices to execute or otherwise use or provide the contents to perform at least some of the described techniques. Some or all of the components and/or data structures may be stored on tangible, non-transitory storage mediums. Some or all of the system components and data structures may also be stored as data signals (e.g., by being encoded as part of a carrier wave or included as part of an analog or digital propagated signal) on a variety of computer-readable transmission mediums, which are then transmitted, including across wireless-based and wired/cable-based mediums, and may take a variety of forms (e.g., as part of a single or multiplexed analog signal, or as multiple discrete digital packets or frames). Such computer program products may also take other forms in other embodiments. Accordingly, embodiments of this disclosure may be practiced with other computer system configurations.

While embodiments of the invention have been illustrated and described, as noted above, many changes can be made without departing from the spirit and scope of the invention. Accordingly, the scope of the invention is not limited by the above disclosure. Claims

The invention claimed is:

1. A method in a server computing system, the method comprising:
    associating an indication of a first authentication process with a client computing system, wherein the first authentication process takes as input a timestamp and generates as output a number that is based on the timestamp;
    receiving a first number from the client computing system, wherein the first number is generated by the client computing system by applying the first authentication process to a first reduced precision timestamp based on a computer clock;
    in response to receiving the first number,
        determining a second reduced precision timestamp based on a computer clock;
        applying a second authentication process to the second reduced precision timestamp to generate a second number based on the second timestamp;
        determining a third reduced precision timestamp that is prior to the second reduced precision timestamp;
        applying the first authentication process to the third reduced precision timestamp to generate a third number based on the third reduced precision timestamp; and
        authenticating the client computing system when the first number matches the second number or when the first number matches the third number.

2. The method of claim 1, further comprising:
    determining one or more communication properties of the client computing system;
    authenticating the client computing system only when the one or more communication properties are allowable; and
    when at least one of the one or more communication properties are not allowable, redirecting network communication from the client computing system to a mock computing system.

3. The method of claim 1, further comprising: authenticating the client computing system only when (1) the first number matches the second number or the first number matches the third number, (2) a user of the client computing system provides an accepted username and password, (3) a network address associated with the client computing system is included in a list of trusted network addresses, and (4) a non-modifiable identifier of the client computing system is included in a list of trusted device identifiers.

4. The method of claim 1, further comprising redirecting network communication from the client computing system to a mock computing system when the first number does not match the second number and when the first number does not match the third number, by: transmitting a network packet to the mock computing system, wherein the network packet is associated with the network communication and addressed to the server computing system.

5. The method of claim 1, further comprising redirecting network communication from the client computing system to a mock computing system when the first number does not match the second number and when the first number does not match the third number, by: modifying a destination network address of a network packet, wherein the modified destination network address identifies the mock computing system.

6. The method of claim 1, wherein the associating an indication of a first authentication process with a client computing system includes: storing the indication of the first authentication process in a table in association with an identifier of the client computing system, wherein the first authentication process is assigned to the client computing system during initial setup, wherein the first authentication process is one of multiple public authentication processes that each generate as output a number that is based on a timestamp.

7. The method of claim 1, wherein the applying a second authentication process to the second timestamp to generate a second number based on the second timestamp includes: applying an operator to the second timestamp and an integer, wherein the operator and the integer are specified by the authentication process.

8. The method of claim 1, further comprising:
    transmitting to the client computing system an indicator of a third authentication process; and
    in a subsequent authentication interaction with the client computing system, applying the third authentication process to a fourth timestamp that is later in time than the third timestamp.

9. The method of claim 8, wherein the transmitting to the client computing system an indicator of a third authentication process includes: transmitting the indicator of the third authentication process in response to authenticating the client computing system, thereby causing the client computing system to use the third authentication process in the subsequent authentication interaction.

10. The method of claim 1, further comprising: in response to an event, transmitting an indication of a new authentication process to the client computing system, wherein the new authentication process replaces a previous authentication process and is to be used in subsequent authentication interactions between the server computing system and client computing system, wherein the event is based on a passage of time or a number of authentication interactions between the client computing system and server computing system.

11. A system, the system comprising:
a server computing system;
a client computing system that is configured to:
receive a first reduced precision timestamp based on a computer clock;
apply a first authentication process to the first reduced precision timestamp to generate a first number based on the first reduced precision timestamp; and
transmit the first number to the server computing system; and
wherein the server computing system is configured to:
receive the first number from the client computing system;
determine a second reduced precision timestamp based on a computer clock;
apply a second authentication process to the second reduced precision timestamp to generate a second number based on the second reduced precision timestamp;
determine a third reduced precision timestamp that is prior to the second reduced precision timestamp;
apply the first authentication process to the third reduced precision timestamp to generate a third number based on the third reduced precision timestamp; and
authenticate the client computing system only when the first number matches the second number or when the first number matches the third number.

12. The system of claim 11, wherein the server computing system is configured to:
store a white list of allowable communication properties, wherein the white list includes one or more of: network addresses, network ports, protocol types, non-modifiable device identifiers, access times, and/or geographic locations;
determine one or more communication properties of the client computing system;
authenticate the client computing system only when the one or more communication properties are allowable; and
when at least one of the one or more communication properties are not allowable, redirect network communication from the client computing system to a mock computing system.

13. The system of claim 12, wherein the server computing system and the mock computing system each provide the same services, and wherein the server computing system includes private data that is not present on the mock computing system.

14. The system of claim 12, wherein the mock computing system is configured to track the network communication and to record that the network communication is associated with an attempt to gain unauthorized access to the server computing system.

15. The system of claim 11, wherein the server computing system is configured to: drop at least one digit of precision from the second timestamp in order to account for differences between the clock of the client computing system and the clock of the server computing system.

16. The system of claim 11, wherein the server computing system is configured to: in response to an event, transmit an indication of a third authentication process to the client computing system, wherein the third authentication process replaces the first authentication process and is to be used in subsequent authentication interactions between the server computing system and client computing system, wherein the event is that the client computing system has been authenticated at least a predetermined number of times.

17. The system of claim 16, wherein the event includes at least one of:
the client computing system has been using the first authentication process for at least a predetermined amount of time; and
a predetermined date or time has passed.

18. The method of claim 11, wherein the first reduced precision timestamp is based on a clock that is local to the client computing system, and wherein the second and third reduced precision timestamps are based on a clock that is local to the server computing system.

19. The system of claim 11, wherein the first, second, and third reduced precision timestamps are based on time provided by a network-accessible time server.

20. The system of claim 11, wherein the server computing system is configured to, when the first number does not match the second number and when the first number does not match the third number, redirect network communication from the client computing system to a mock computing system.

* * * * *